United States Patent [19]

Tomoda et al.

[11] 4,282,918
[45] Aug. 11, 1981

[54] CARCASS ARRANGEMENT IN SHOULDER OF PNEUMATIC TIRE

[75] Inventors: Hajime Tomoda, Atsugi; Ken Takahashi, Hiratsuka, both of Japan

[73] Assignee: The Yokohama Rubber Co., Ltd., Tokyo, Japan

[21] Appl. No.: 49,034

[22] Filed: Jun. 15, 1979

[30] Foreign Application Priority Data

Jun. 29, 1978 [JP] Japan ................................. 53/78064

[51] Int. Cl.³ ............................................ B60C 9/02
[52] U.S. Cl. ............................ 152/353 C; 152/354 R
[58] Field of Search ............... 152/35 C, 35 R, 354 R, 152/360, 374, 352 R

[56] References Cited

U.S. PATENT DOCUMENTS

| 1,836,091 | 12/1931 | Shoemaker | 152/352 |
|---|---|---|---|
| 3,253,635 | 5/1966 | Travers | 152/354 |
| 3,480,065 | 11/1969 | Verdier | 152/353 |
| 3,757,844 | 9/1973 | Verdier | 152/361 FP |
| 3,789,900 | 2/1974 | Verdier | 152/356 |
| 3,892,268 | 7/1975 | Powell et al. | 152/354 |
| 3,954,131 | 5/1976 | Hoshine et al. | 152/353 R |
| 4,037,637 | 7/1977 | Arimura et al. | 152/352 R |

Primary Examiner—Michael W. Ball
Attorney, Agent, or Firm—Armstrong, Nikaido, Marmelstein & Kubovcik

[57] ABSTRACT

A pneumatic tire having a carcass ply of metal cords arranged and embedded in the radial direction in a rubber is disclosed. This carcass ply has a natural sectional profile, and the position of the carcass ply in the shoulder portion of the tire satisfies the requirement of $0.3 \leq t_2/t_1 \leq 1.0$ in which $t_2$ designates the thickness of the tire inside the carcass ply and $t_1$ designates the thickness of the tire outside the carcass ply. In this shoulder portion, the thickness of an inner liner layer inside the carcass cord is gradually reduced toward the center of the tire top and the maximum width position of the tire. This pneumatic tire is preferably used for a high-load vehicle.

7 Claims, 8 Drawing Figures

CARCASS ARRANGEMENT IN SHOULDER OF PNEUMATIC TIRE

BACKGROUND OF THE INVENTION (1) Field of the Invention

The present invention relates to a pneumatic tire having a radial structure. More particularly, the invention relates to a pneumatic tire in which the structure of the shoulder region of the tire is improved.

(2) Description of the Prior Art

In a radial tire, the side wall portion has a higher flexibility and a larger quantity of deformation than in a tire of a bias structure, but the tire tread portion has a high rigidity and is hardly deformable. Accordingly, the tire shoulder portion located intermediately between the side wall portion and the tread portion undergoes large discontinuous stress or strain by the inner pressure and load. Moreover, a carcass ply arranged in the radial direction, which acts as a tension member in the region of this soulder portion, inevitably receives high shearing. Accordingly, shearing stress or strain is caused in the interface of the carcass ply and stress or strain is always imposed on the interface of the carcass ply by repeated bending and deformation during driving. Therefore, fatigue is readily caused in a rubber covering the carcass cords in the region of the shoulder portion, resulting in reduction of the bonding strength between the carcass cord and rubber. This reduction of the bonding strength proceeds as a function of the level of the shearing force and the driving distance. When the bonding strength is reduced below the level of the shearing force acting between the carcass cord and the covering rubber, peeling is caused between the carcass cord and the covering rubber. That is, a trouble so-called "separation" is caused. Occurrence of this trouble is especially conspicuous in case of a metal cord carcass.

As means for eliminating the above disadvantage, there have been proposed a technique of improving bonding between a cord and a rubber, a technique of plating a metal cord for improving its bonding to a cord, a technique of arranging a synthetic fiber cord layer to protect a carcass ply in the tire shoulder portion as disclosed in the specification of U.S. Pat. No. 3,789,900 and a technique of making a shape or profile of a carcass ply in agreement with a natural sectional profile so as to reduce the initial shearing stress as the time of application of the inner pressure as disclosed in the specifications of U.S. Pat. Nos. 3,757,844 and 4,037,637.

In each of these conventional pneumatic tires having a radial structure, the problem of occurrence of a separation trouble between a carcass ply, especially a metal cord carcass ply, and a covering rubber in the region of the tire shoulder portion, which is caused while the tire is used for a long time, has not been completely solved. This problem is especially serious in tires for use in high-load vehicles such as large trucks and busses.

SUMMARY OF THE INVENTION

It is therefore a primary object of the present invention to provide an improved pneumatic tire having a radial structure, in which the foregoing defect involved in the conventional techniques is eliminated, the bonding relation between the tread portion and the side wall portion on the earth-contacting side of the tire during driving is improved, generation of the shearing stress is particularly reduced in the vicinity of the interface between a carcass ply, especially a cord carcass ply, and a covering rubber in the region of the tire shoulder portion, and the force imposed on the covering rubber is appropriately distributed.

Another object of the present invention is to provide a pneumatic tire having improved durability and safety, which can be advantageously used in a high-load vehicle such as a large truck or bus and in which occurrence of a separation trouble in the tire shoulder portion is effectively prevented even when the tire is used for a long time.

Other object of the present invention will be apparent from the detailed description given hereinafter.

In accordance with the present invention, these objects can be attained by a pneumatic tire comprising a belt layer composed of a plurality of crossing belt plies embedded in the tread portion and a carcass ply embedded along the tread portion, side wall portion and bead portion and arranged in the radial direction or substantially in the radial direction, said carcass ply being contiguous to the belt layer at the center of the tire top and being gradually separated from the belt layer toward both the ends of said belt layer by a wedge-shaped elastic interposing member, wherein the carcass ply is arranged so that in connection with the central point (d) of the carcass ply on the central line of the distance (D) in the widthwise direction of the tire between the central point (a) of the carcass ply on the maximum width position (A—A') of the tire and the outermost end portion (E) of the region where at least two belt plies cross each other, the tire thickness $t_2$ in the direction of the normal line (f) of the carcass profile passing through said central point (d) on the inside of the carcass ply and the tire thickness $t_1$ in the direction of said normal line (f) on the outside of the carcass ply satisfy the requirement of $0.3 \leq t_2/t_1 \leq 1.0$.

In the present invention, as is seen from FIG. 1 described hereinafter, the tire thickness in the direction of the normal line (f) passing through said central point (d) of the shoulder portion is expressed by the distance between the inner surface of the inner liner layer of the tire and the portion of the tire defining substantially the outer contour on the outer surface of the shoulder portion of the tire. Accordingly, the height of a decorative projection or the like formed on the surface of the shoulder portion of the tire is not included in this tire thickness.

In the present invention, as is apparent from the foregoing illustration, the carcass ply is embedded in a covering rubber of the tire and the inner liner layer is formed on the inner surface thereof. It is preferred that the inner liner layer disposed on the inside of the carcass ply be arranged so that the thickness $t_2$ of the inner liner layer is largest in the vicinity of said central point (d) in the region between the central point (a) of the carcass ply on the maximum width position (A—A') of the tire and the outermost end portion (E) where at least two belt plies cross each other and the thickness $t_2$ of the inner liner layer is gradually decreased toward said central point (a) and outermost end portion (E).

The carcass ply has a natural sectional profile, and it is preferred that in the region between the maximum width position (A—A') of the tire and the center (B) of the tire top, this natural sectional profile be defined by three curves (circles), that is, a curve having a curvature radius (Ra) in the tread portion, a curve having a curvature radius (Rb) in the side wall portion and a curve having a curvature radius (Rg) in the shoulder portion, which consists of a circle tangential to said two curves. In this case, it is sufficient that the requirement of Ra>Rb≧Rg is satisfied among the curvature radii Ra, Rb and Rg. It is especially preferred that the carcass ply be arranged from the maximum width position of the tire to the center of the tire top along a curve formed by connecting three substantially different circles having curvature radii Ra, Rb and Rg satisfying the requirement of Ra>Rb>Rg.

In the pneumatic tire having the above-mentioned structure according to the present invention, supposing that the height of the tire measured in the direction radial to the rotation axis of the tire (in the radial direction) is expressed as H, it is possible to easily bring the maximum width position (A—A') of the tire close to the side of the bead portion so that the distance h between the maximum width position (A—A') and the bead portion is greater than ½ of H, and the effects of the present invention, described hereinafter, can be further enhanced.

According to the present invention, it is possible to obtain a carcass ply profile where the maximum width position of the tire is brought close to the tire top, without substantial change of the shape of the outer contour of the tire, and therefore, the tension imposed on the carcass cord on application of the inner pressure can be reduced and the radius of curvature of the contour curve defining the carcass ply is inevitably increased over this radius of curvature in conventional tires. Accordingly, the initial profile of the carcass ply in the shoulder portion of the tire is made to resemble the profile observed when it is contacted with the earth, and the radius of curvature of the carcass ply on the earth-contacting side is advantageously changed during driving and the force imposed on the carcass cord on the earth-contacting side during driving can be reduced to a level much lower than in conventional tires. In general, the stress imposed on the covering rubber (inner liner layer) on the inside of the carcass ply is 2.8 to 5.0 times as high as the stress imposed on the covering rubber on the outside of the carcass ply. Accordingly, in conventional tires, the inner liner layer is readily broken by the shearing force on the interface between the carcass ply and the inner liner layer. In contrast, according to the present invention, the above stress is effectively absorbed and dispersed and is reduced to a level corresponding to 30 to 55% of the stress in conventional tires, and therefore, breakage of the inner liner layer in the interface between the carcass ply and the inner liner layer can be effectively prevented.

These effects of the present invention are advantageously attained when the present invention is applied to a pneumatic radial tire for a high-load vehicle, in which metal cords are used for the belt layer and carcass ply.

BRIEF DESCRIPTION OF THE DRAWING

FIG. 4-A is a diagram illustrating the relation between the total thickness of the covering rubber and the shearing breakage load ratio.

FIG. 4-B is a diagram illustrating the relation between the ratio of the thickness $t_2$ of the covering rubber on the inside of the carcass ply to the thickness $t_1$ of the covering rubber on the outside of the carcass ply (that is, the thickness ratio $t_2/t_1$) and the shearing breakage load ratio.

DETAILED DESCRIPTION OF THE PREFERRED EMBODIMENTS

The features of the present invention will now be described in detail by reference to the accompanying drawing.

Figure 1:
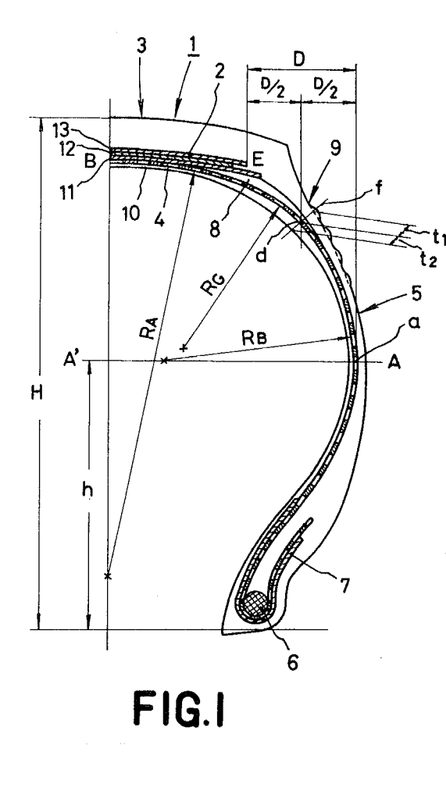
FIG. 1 is a sectional partial view illustrating one embodiment of the pneumatic tire of the present invention.

FIG. 1 is a sectional partial view illustrating the section in the radial direction of one embodiment of the pneumatic tire according to the present invention. Referring to FIG. 1, a reinforcing belt layer 2 composed of a plurality of belt plies of tire cords is embedded in a tread portion 3, and a carcass ply 4 composed of metal cords is embedded along the tread portion 3, a side wall portion 5 and a bead portion. Each of both the ends of the carcass ply 4 is wound up around a bead core 6 of the bead portion from the inside of the tire 1 toward the outside of the tire 1. A reinforcing member 7 composed of a metal cord or the like is arranged around the wound-up end portion of the carcass ply 4. A wedge-shaped elastic interposing member 8 is disposed between the belt layer 2 and the carcass ply 4 in a shoulder portion 9 located intermediately between the tread portion 3 and the side wall portion 5. An inner liner layer 10 is disposed to protect the carcass ply 4 from the inner face of the tire 1.

Referring to FIG. 1, the belt layer 2 comprises three belt plies 11, 12 and 13. These belt plies 11, 12 and 13 are arranged so that the belt ply 11 is downwardly inclined to the right by about 15° with respect to the equator line, the belt ply 12 is downwardly inclined to the left by about 15° with respect to the equator line and the belt ply 13 is downwardly inclined to the left by about 15° with respect to the equator line.

At least two of the belt plies of the belt layer 2 are arranged to cross each another so that the direction of cords of one ply differs from the direction of cords of the other ply. In the belt layer, the positions of the outermost end portions (E) of the respective plies may be in agreement with one another in the tread width direction. Alternately, these positions may be different as shown in FIG. 1.

The carcass ply 4 is arranged in the radial direction with an angle of 90° or about 90° to the equator face of the tire. This carcass ply 4 having a natural sectional profile is contiguous to the belt layer 2, more specifically the belt ply 11, at the center of the tire top, and the carcass ply 4 is gradually separated from the belt layer 2 toward both the end portions of the belt layer 2 by the wedge-shaped interposing member 8.

The carcass ply 4 has preferably a natural sectional profile as pointed out above. The natural sectional profile of the carcass ply 4 from the maximum width position (A—A′) of the tire to the center (B) of the tire top is approximately defined by three radii Ra, Rb and Rg of curvature if calculation is made while regarding the carcass ply 4 as a filmy completely elastic body.

In general, in the carcass ply region defined by the curvature radius Ra of the tread portion and the carcass ply region defined by the curvature radius Rb of the side wall portion, the carcass ply 4 receives a so-called hoop effect of the breaker layer (belt layer), and therefore, the shearing stress imposed on the interface of the carcass ply on the earth-contacting side during driving is low and the change ratio thereof is small. However, in the carcass ply region defined by the curvature radius Rg of a circle tangential to the circles of curvature radia Ra and Rb, that is, in the shoulder portion of the tire, concentration of the shearing stress cannot be avoided. The reason is that although in the carcass ply regions defined by the curvature radii Ra and Rb, the stress or strain by shearing of the carcass ply and covering rubber is small because the change of the carvature radius is small either at time of application of the inner pressure or at time of contacting with the earth, the shoulder portion of the tire is located at a position connecting the carcass ply and covering rubber which are different from each other with respect to the movement and is disposed in a zone where the rigidities of the carcass ply and covering rubber become discontinuous to each other. Therefore, in the shoulder portion of the tire, a trouble is readily caused due to separation of the carcass cord from the covering rubber.

Figure 2:
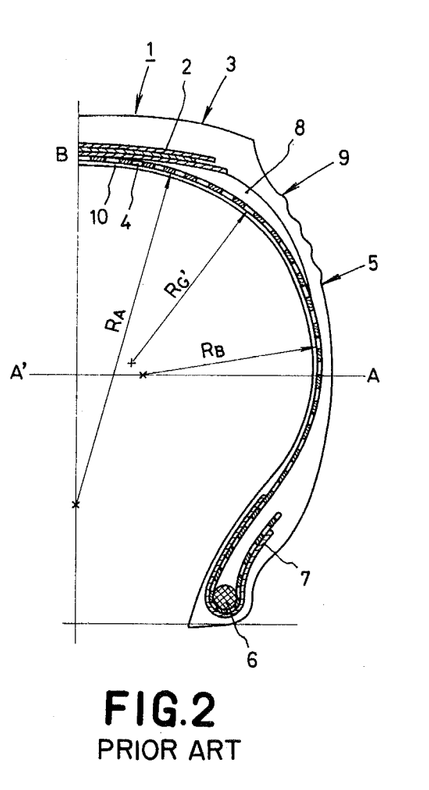
FIG. 2 is a sectional partial view illustrating a conventional pneumatic tire.

Referring to FIG. 2 which is a sectional partial view showing the section in the radial direction of a conventional tire, where reference numerals and symbols have the same meaning except the radius Rg′ of curvature, the level of the shearing stress acting on an inner liner layer 10 on the inside of a carcass ply 4 is 2.8 to 5.0 times as high as the level of the shearing stress acting on a side wall portion 5 on the outside of the carcass ply 4 as pointed out hereinbefore, and hence, a separation trouble is readily caused in the shoulder portion as pointed out hereinbefore. The main reason is that the position of the carcass ply 4 in the shoulder portion 9 of the tire is drawn toward the inner face of the tire as shown in FIG. 2. Furthermore, the curvature radius Rg′ has a value relatively close to the value of the curvature radius Rb [for example, Rg′=(1.0 to 0.98)×Rb] and the thickness of the inner liner layer 10 is substantially uniform in the shoulder portion. Still another reason is that the maximum width position (A—A′) in the conventional tire is lower than in the tire of the present invention shown in FIG. 1.

In contrast, in the pneumatic tire of the present invention, as shown in FIG. 1, the position of the carcass ply 4 in the shoulder portion 9 of the tire is brought close to the center with respect to the thickness thereof, that is, to the center of the thickness without particularly changing the entire thickness and outer contour of the shoulder portion 9. In this case, the curvature of the carcass ply 4 in the shoulder portion 9 of the tire is larger than the curvature of the carcass ply in the shoulder portion of the conventional tire. More specifically, the curvature radius Rg in this portion of the tire of the present invention is smaller than the curvature radius Rg′ in this portion of the conventional tire. For example, when the curvature radius Rg′ of the conventional tire is 104 to 108 mm, the curvature radius Rg of the corresponding tire of the present invention is 90 to 95 mm.

This feature will now be described with respect to the position of the carcass line in the thickness direction of the shoulder portion 9 of the tire.

The point where the center of the carcass ply 4 intersects the central line of the distance (D) in the widthwise direction of the tire between the central point (a) of the carcass ply 4 on the maximum width position (A—A′) of the tire and the outer most end portion (E) of the region where at least two belt plies, that is, the belt plies 11 and 13 in the embodiment shown in FIG. 1, cross each other is designated as the point (d) as shown in FIG. 1. The position of the carcass ply 4 is arranged so that the thickness $t_2$ of the tire of the inside with respect to the direction of the normal line (f) of the carcass-defining contour at this point (d) and the thickness $t_1$ of the tire on the outside with respect to the direction of said normal line (f) satisfy the requirement of $0.3 \leq t_2/t_1 \leq 1$. For example, when the sum of $t_1$ and $t_2$ is 15 mm while $t_1$ is 11.4 mm and $t_2$ is 3.6 mm, the ratio $t_2/t_1$ is 0.32.

The significance of this requirement will now be described.

Figure 3:
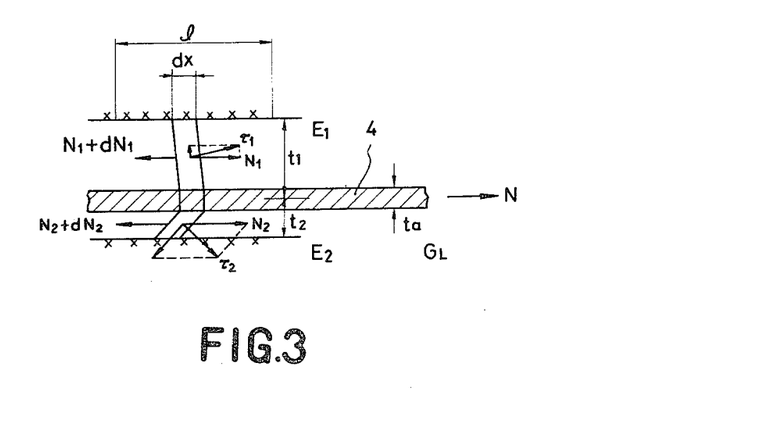
FIG. 3 is a model diagram illustrating the method for measuring the shearing load causing breakage in the interface between the carcass ply and covering rubber.

The shearing breakage load is determined according to the method shown in the model diagram of FIG. 3.

If the relation of the shearing stresses $\tau_1$ and $\tau_2$ by the force N imposed in the cord direction of the carcass ply 4 to the shearing breakage load N crack of the interfaces of the carcass ply (longitudinal elasticity constant=GL, thickness=ta) to the covering rubber layer (elasticity constant=$E_1$, thickness=$t_1$) on the outside of the carcass ply and the covering rubber layer (elasticity constant=$E_2$, thickness=$t_2$) is considered according to the concept of the critical strength based on the energy balance, as is well known, the relation of N crack ∝ $\sqrt{E_2 t_2}$ is established in case of $E_1 t_1 > E_2 t_2$, and the shearing breakage load is influenced by the elasticity constant and thickness of each covering rubber layer. However, values of elasticity constants $E_1$ and $E_2$ of covering rubber layers used for ordinary pneumatic tires are too small as factors having substantial influences in the N crack.

Accordingly, we made the following experiment. More specifically, a steel carcass ply (thickness ta=1.85 mm) was embedded in a single rubber material (that is, the relation of $E_1 = E_2$ is established), and the influences of the entire rubber thickness ($t_1 + t_2$) and the thickness ratio of the covering rubber layers ($t_2/t_1$) on the shearing breakage load were examined. The obtained results are shown in FIGS. 4-A and 4-B.

Figure 4:
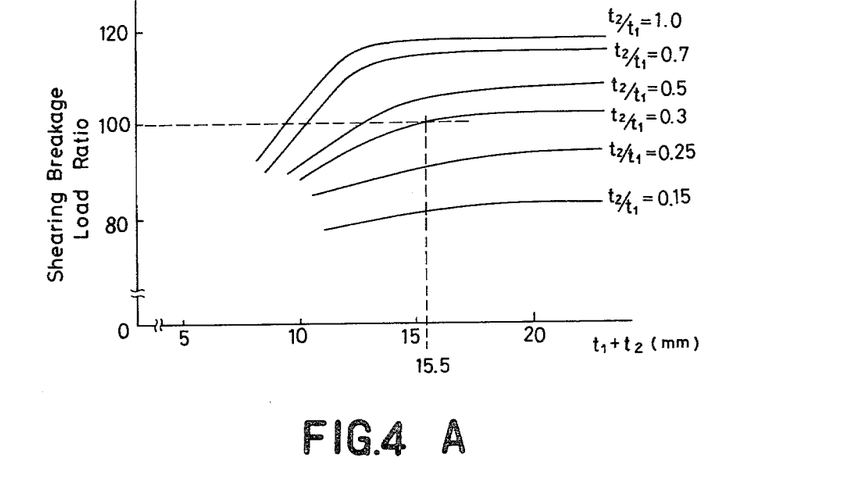
Figure 4B:
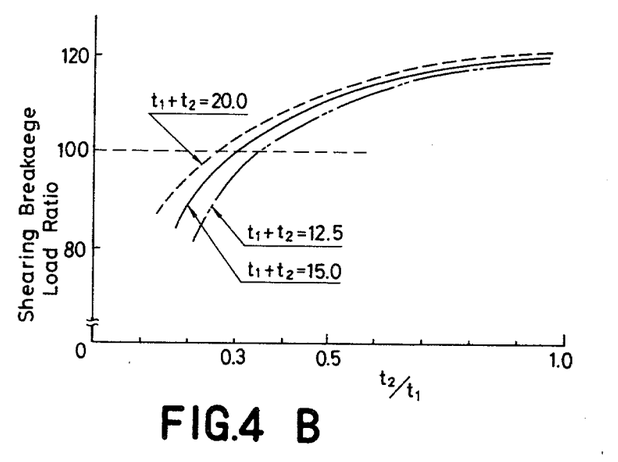

As is seen from the results shown in FIG. 4-A, when the total covering rubber layer thickness ($t_1 + t_2$) exceeds a certain value, the influence of the N crack is not increased but is kept constant. On the other hand, as is seen from the results shown in FIG. 4-B, when the thickness ratio ($t_2/t_1$) of the covering rubber layer is increased, also the N crack is increased and has a maximum value when $t_2/t_1$ is 1. The effect of increasing the N crack is prominent when the relation of $t_2/t_1 \geq 0.3$ is established.

Figure 5:
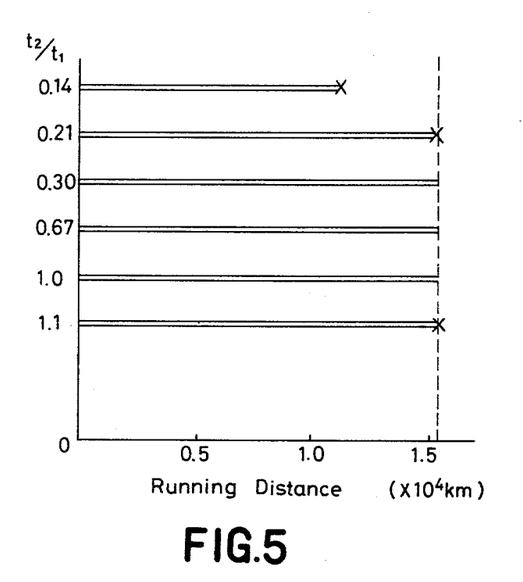
FIG. 5 is a diagram illustrating the influences of the tire thickness ratio $t_2/t_1$ and the running distance on the breakage of the tire.

Based on the above findings, the tire of the present invention and the conventional tire (each being a tire of a size of 10.00R20 and 14PR) were set at rims of 7.50V×20IR and air was filled under an inner pressure of 9.0 kg/cm². These pneumatic tires were subjected to the indoor rotary drum test. The obtained results are shown in FIG. 5. The ratio $t_2/t_1$ in FIG. 5 is the ratio of the thickness $t_2$ of the tire on the inside of the central line of the carcass ply in the direction of the normal line (f) of the profile of the carcass at the central point (d) of the carcass of the shoulder portion of the tire to the thickness $t_1$ on the outside of the central line of the carcass ply in the direction of the normal line (f) of the profile of the carcass at the central point (d) of the carcass of the shoulder portion of the tire as shown in FIG. 1. The results shown in FIG. 5 will now be described.

In case of a tire of $t_2/t_1=0.14$, by driving of $1.15 \times 10^4$ Km, the carcass cords were exposed to the inner face of the tire and breakage was caused. In case of a tire of $t_2/t_1=0.21$, by driving of $1.55 \times 10^4$ Km, the tendency of exposure of carcass cords to the inner face of the tire was observed. In case of a tire of $t_2/t_1=0.3$, 0.67 or 1.7, no change was observed even after driving of $1.6 \times 10^4$ Km. However, in case of a tire of $t_2/t_1=1.1$, formation of wrinkles was observed on the outer face of the tire after driving of $1.6 \times 10^4$ Km. From these results, it has been confirmed that good effects can be obtained within the range of $0.3 \leq t_2/t_1 \leq 1$. It has also been confirmed that in case of $t_2/t_1 < 0.3$, that is, when the carcass ply is arranged too near the inner side of the tire with respect to the tire thickness, the rubber of the inner face of the tire is readily destroyed, and that in case of $t_2/t_1 > 1$, that is, when the carcass ply is arranged too near the outer side of the tire with respect to the tire thickness, the quantity of the strain on the surface of the shoulder portion of the tire is increased and cracks or wrinkles are formed on the surface of the tire, resulting in reduction of the capacity and appearance characteristics of the tire.

Figure 6:
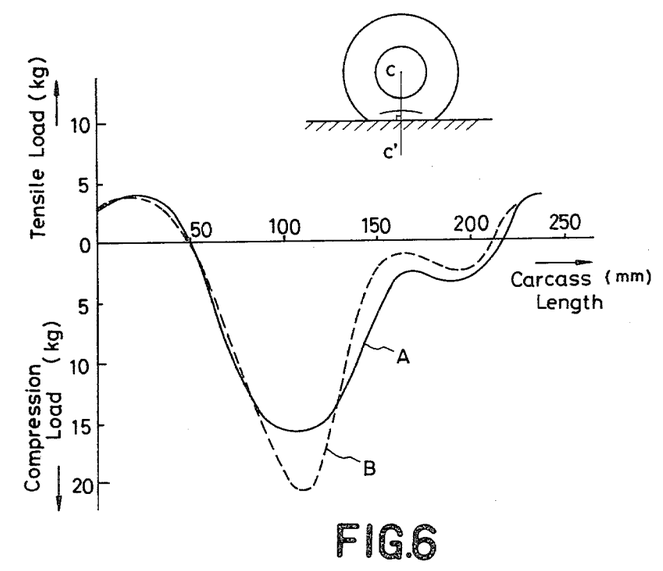
FIG. 6 is a diagram illustrating the shearing stress (tensile load and compression load) on the interface of the carcass ply in the radial direction from the position of the center of the tire crown, in which the abscissa indicates the carcass length (mm) in the radial direction from the center of the tire crown.

FIG. 6 is a diagram illustrating the distribution of the shearing stress imposed in the cord direction on the interface of the carcass ply on the earth-contacting side of the tire when the tire is under a load.

A tire of the same size as described above (10.00R20 and 14PR) was used. In the tire of the present invention, the carcass ply was arranged so that $t_2/t_1$ was 0.32 and in the conventional tire, the carcass ply was arranged so that $t_2/t_1$ was 0.19. Each tire was set at a rim of 7.50V×20IR, and after air had been filled under an inner pressure of 7.25 Kg/cm², a standard load of 2700 Kg was imposed. As a result, it was found that the shearing stress on the tire A of the present invention was reduced to $\frac{3}{4}$ of the shearing stress on the conventional tire B as compared based on the maximum value, and thus, it was confirmed that the stress was effectively dispersed in the tire A of the present invention. From such finding, it will readily be understood that when the bonding strength between the carcass cord and covering rubber is reduced by fatigue caused by long-time use, peeling of the carcass cord from the rubber takes place at a bonding strength of 21.0 Km/cord in the conventional tire B, but in the tire A of the present invention, peeling is not caused before the bonding strength is degraded to 15.5 Km/cord. Of course, these results are ones obtained under the standard load condition. Since the level of the shearing stress is increased in proportion to the quantity of the longitudinal flexion of the tire, under a severer condition the difference of the bonding strength causing peeling (hereinafter referred to "critical bonding strength") between the tire A of the present invention and the conventional tire B is increased, and therefore, the effects of the present invention are enhanced.

Figure 7:
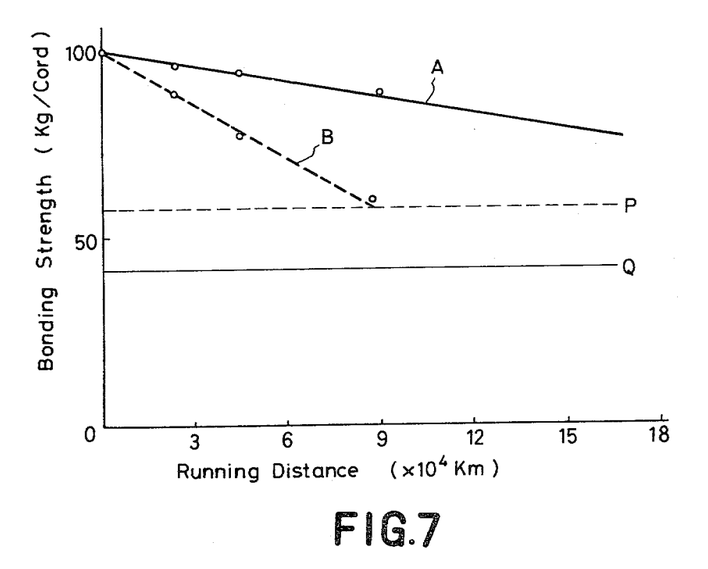
FIG. 7 is a diagram illustrating the relation between the running distance and the bonding strength between the carcass cord and the covering rubber.

Air was filled in the same two tires as used in the experiment of FIG. 6 under an inner pressure of 9.0 Kg/cm², and the actual car driving test was carried out by using these tires. The obtained results are shown in FIG. 7. In FIG. 7, A and B have the same meaning as described with respect to FIG. 6, and P and Q have the following meaning:

P: the critical bonding strength of the conventional tire shown in FIG. 2 under the present experiment conditions Q: the critical bonding strength of the tire of the present invention shown in FIG. 1 under the present experiment conditions As is seen from the results shown in FIG. 7, no change was observed in the tire A of the present invention even after driving of $9 \times 10^4$ Km, but in the conventional tire B, peeling was caused between the carcass cord and the covering rubber by driving of $8.7 \times 10^4$ Km. At this point, the bonding strength in the conventional tire B was reduced to 60% of the initial bonding strength, whereas the bonding strength in the tire A of the present invention the bonding strength was still maintained at a level of 87% of the initial bonding strength. Further, after driving of predetermined distances, the above-mentioned indoor driving test was stopped and the bonding strength between the carcass cord and covering rubber was examined. As a result, it was found that the bonding strength was linearly decreased as the driving distance was increased. In this experiment, it was confirmed that the critical bonding strength was 60 Kg/cord in case of the conventional tire B and 42 Kg/cord in case of the tire A of the present invention. Thus, it was found that in the tire A of the present invention, the capacity can be sufficiently exerted even under heavy load conditions until the life of the tire finally expires because of wearing of the tread portion of the tire.

As will be apparent from the foregoing illustration, in order to increase the durability of the tire in the present invention over the durability of the conventional tire, it is important that the carcass ply should be arranged so that the ratio of the thickness $t_2$ of the tire on the inner side from the center of the carcass ply to the thickness $t_1$ of the tire on the outer side from the center of the carcass ply is within the range of $0.3 \leq t_2/t_1 \leq 1$.

Typical instances of tires satisfying this requirements are shown in Table 1.

TABLE 1

| Tire Size | Sectional Height(H) of Tire | Maximum Width(W) of Tire | Rim Width (RW) | $R_A$ | $R_B$ | $R_G$ | D | $t_a$ | $t_1$ | $t_2$ | $t_c$ |
|---|---|---|---|---|---|---|---|---|---|---|---|
| 900R20 | 10.06 | 9.92 | 7.0 | 7.48 | 3.76 | $0.96R_B$ | 1.83 | | 0.132 | 0.377 | 0.040 |
| 10R22.5 | 8.81 | 9.92 | 7.5 | ~ 19.7 | ~ 4.41 | ~ $0.92R_B$ | +0.3 −0.2 | 0.053 | ~ 0.302 | ~ 1.002 | ~ 0.175 |
| 10.00R20 10.00R22 | 10.75 | 10.67 | 7.5 | 8.66 | 3.85 | $0.96R_B$ | 2.12 | | 0.140 | 0.398 | 0.050 |

TABLE 1-continued

| Tire Size | Sectional Height(H) of Tire | Maximum Width(W) of Tire | Rim Width (RW) | $R_A$ | $R_B$ | $R_G$ | D | $t_a$ | $t_1$ | $t_2$ | $t_c$ |
|---|---|---|---|---|---|---|---|---|---|---|---|
| 11R22.5 | 9.50 | 10.67 | 8.25 | ~ 21.25 | ~ 4.65 | ~ 0.92$R_B$ | +0.4 −0.2 | 0.060 | ~ 0.345 | ~ 1.230 | ~ 0.200 |
| 11R24.5 | | | | | | | | | | | |
| 11.00R20 | 11.02 | 11.32 | 8.0 | 9.06 | 3.94 | 0.96$R_B$ | 2.21 | | 0.140 | 0.398 | 0.050 |
| 11.00R22 | | | | ~ 22.05 | ~ 4.74 | ~ 0.92$R_B$ | +0.5 −0.2 | 0.060 | ~ 0.405 | ~ 1.380 | ~ 0.200 |
| 12R22.5 | 9.77 | 11.32 | 9.0 | | | | | | | | |
| 12R24.5 | | | | | | | | | | | |
| 12.00R20 | 12.01 | 11.73 | 8.5 | 10.23 | 4.17 | 0.96$R_B$ | 2.28 | | 0.145 | 0.403 | 0.060 |
| 13R22.5 | 10.76 | 11.73 | 9.0 | ~ 23.62 | ~ 4.80 | ~ 0.92$R_B$ | +0.6 −0.2 | 0.070 | ~ 0.510 | ~ 1.685 | ~ 0.225 |

Note:
Unit: Inch, $R_G' \approx R_B$ [i.e. $R_G' = (1.0-0.98)R_B$]

In practising the present invention, it is preferred that the thickness of the inner liner layer be at the maximum in the vicinity of the above-mentioned central point (d), and that the thickness of the inner liner layer be gradually decreased toward the maximum tire width position (A—A') nearest therefrom and also toward the outermost end portion (E) of the belt ply. In this case, the decrease of the thickness of the innerliner layer may be extended beyond said point (E) along the tread portion up to the center (B) of the tire top. In other portions of the inner liner layer, that is, the region including the center (B) of the tire top and the part extending from the lower part of the side wall portion to the bead portion, the thickness may be uniform. In this case, it is preferred that the thickness ta of the inner liner layer in these portions be selected from values shown in Table 1.

By virtue of this feature of changing the thickness of the inner liner layer in the tread shoulder portion of the tire as well as the above-mentioned specific arrangement of the carcass ply, separation of the carcass cords from the covering rubber can be effectively prevented according to the present invention.

Furthermore, in the present invention, it is preferred that the ratio among the above-mentioned curvature radii Ra, Rb and Rg, especially the ratio between the curvature radii Rb and Rg, be made different from such ratio in the conventional tire. More specifically, it is preferred that the relation of Rb≧Rg, particularly $0.96 \times Rb \geq Rg \geq 0.92 \times Rb$, be established.

In order to facilitate designing of the tire, in the present invention, it is preferred that the maximum tire width position (A-A') be brought close to the side of the tread portion so that the relation of h>0.5 H is established, wherein H stands for the tire height measured along the distance from the bead portion to the tread portion in the direction perpendicular to the rotation axis of the tire and h stands for the tire height measured along the distance from the bead portion to the maximum width position in the same direction as described above. From the viewpoints of the entire balance and capacity of the tire, it is especially preferred that h be in the range of from 0.52 H to 0.54 H.

As pointed out hereinbefore, in the present invention, a wedge-shaped interposing member is used as well as the inner liner disposed on the inside of the carcass ply and the covering rubber disposed on the outside of the carcass ply. A rubber having such a property that the heat generated during use of the tire is reduced is preferably used for this wedge-shaped interposing member.

Kinds and physical properties of such rubber will now be described.

It is preferred that the Young's modulus of the rubber constituting the wedge-shaped interposing member be in the range of from 0.27 to 0.4 Kg/mm$^2$. Furthermore, it is preferred that the Young's modulus of the rubber constituting the inner liner be 1.0 to 1.5 times that of the wedge-shaped interposing member and the Young's modulus of the carcass cord-covering rubber constituting the carcass ply be in the range of 0.4 to 0.6 Kg/mm$^2$. Moreover, it is preferred that the rubber constituting the thickness-increased portion of the inner liner layer at the abovementioned point (E) is the same rubber as the carcass cord-covering rubber. The Young's modulus mentioned herein is one determined from 25% tensile modulus according to the Mooney-Rivlin formula.

As will be apparent from the foregoing illustration, according to the present invention, there can be provided a pneumatic tire for a high-load vehicle comprising metal cords (for example, steel cords) arranged in the radial direction, wherein the durability is remarkably improved, occurrence of a separation trouble is prevented effectively prevented and the safety is considerably enhanced.

The structure of the pneumatic tire of the present invention is not limited to those illustrated in the accompanying drawing and described hereinbefore, and it must be noted that various changes and modifications may be made to the structure, shape and material of the tire without departing from the spirit and scope of the invention.

What we claim is:

1. An improved pneumatic tire comprising a belt layer composed of a plurality of crossing belt plies embedded in the tread portion, an inner liner layer, and a carcass ply embedded along the tread portion, shoulder portion, side wall portion and bead portion and arranged in the radial direction or substantially in the radial direction, said carcass ply being contiguous to the belt layer at the center of the tire top and being gradually increasingly separated from the belt layer toward both ends of said belt layer by a wedge-shaped elastic interposing member, said carcass ply further having a natural sectional profile and in the region between the maximum width position (A-A') of the tire and the center (B) of the tire top, said natural sectional profile is defined by three curves (circles), that is, a curve having a curvature radius (Ra) in the tread portion, a curve having a curvature radius (Rb) in the side wall portion and a curve having a curvature radius (Rg) in the shoulder portion, which consists of a circle tangential to said two curves, said curvature radii (Ra), (Rb) and (Rg) satisfying the requirement of (Ra)>(Rb)≧(Rg), wherein the improvement consists in that said inner liner layer is integrally formed with no interiorly facing projections thereon and that said carcass ply is disposed in the shoulder portion of the tire in the vicinity of the center of thickness of the shoulder portion and is arranged so that, in connection with the central portion (d) of the carcass ply on the central line of the distance (D) in the widthwise direction of the tire between the central point (a) of the carcass ply on the maximum width portion (A-A') of the tire and the outermost end portion (E) of the region where at least two belt plies cross each other, the thickness $t_2$ of the inner liner layer in the direction of the normal line (f) of the carcass profile passing through said central point (d) on the inside of the carcass ply and the thickness $t_1$ in the direction of said normal line (f) on the outside of the carcass ply satisfy the requirement of $0.3 \leq t_2/t_1 \leq 1.0$ and so that the thickness $t_2$ of the inner liner layer is largest in the vicinity of said central point (d) in the region between the central point (a) of the carcass ply on the maximum width portion (A-A') of the tire and the outermost end portion (E) where at least two belt plies cross each other and the thickness $t_2$ of the inner liner layer is gradually decreased toward said central point (a) and outermost end portion (E).

2. A pneumatic tire as set forth in claim 1 wherein the requirements of Ra>Rb>Rg and $0.92Rb \leq Rg \leq 0.96Rb$ are satisfied among the curvature radii Ra, Rb and Rg.

3. A pneumatic tire as set forth in claim 1 wherein the maximum width position (A-A') of the tire is brought close to the side of the tread portion so that the relation of h>0.5 H is established, wherein H stands for the tire height measured along the distance from the bead portion to the tread portion in the direction radial to the rotation axis of the tire and h stands for the tire height measured along the distance from the bead portion to the maximum width position in said direction.

4. A pneumatic tire as set forth in claim 1 wherein the carcass ply is composed of metal cords.

5. A pneumatic tire as set forth in claim 1 wherein each of the belt plies is composed of metal cords.

6. A pneumatic tire as set forth in claim 1 wherein the belt layer is composed of three belt plies.

7. A pneumatic tire for a high-load vehicle comprising an inner liner layer, a belt layer composed of a plurality of crossing belt plies embedded in the tread portion and a carcass ply embedded along the tread portion, side wall portion and bead portion and arranged in the radial direction or substantially in the radial direction, said carcass ply being contiguous to the belt layer at the center of the tire top and being gradually increasingly separated from the belt layer toward both the ends of said belt layer by a wedge-shaped elastic interposing member; wherein the carcass ply is arranged so that in connection with the central point (d) of the carcass ply on the central line of the distance (D) in the widthwise direction of the tire between the central point (a) of the carcass ply on the maximum width position (A-A') of the tire and the outermost end portion (E) of the region where at least two belt plies cross each other, the tire thickness $t_2$ in the direction of the normal line (f) of the carcass profile passing through said central point (d) on the inside of the carcass ply and the thickness $t_1$ in the direction of said normal line (f) on the outside of the carcass ply satisfy the requirement of $0.3 \leq t_2/t_1 \leq 1.0$; each of said carcass ply belt plies is composed of metal cords; the inner liner layer disposed on the inside of the carcass ply is interally formed having no interiorly facing projections thereon and is arranged so that the thickness $t_2$ of the inner liner layer is largest in the vicinity of the central point (d) in the region between the central point (a) of the carcass ply on the maximum width position (A-A') of the tire and the outermost end portion (E) where at least two belt plies cross each other and is gradually decreased toward said central point (a) and outermost end portion (E); and wherein said carcass ply has a natural sectional profile and in the region between the maximum width position (A-A') of the tire and the center (B) of the tire top, said natural sectional profile is defined by three curves (circles), that is, a curve having a curvature radius (Ra) in the tread portion, a curve having a curvature radius (Rb) in the side wall portion and a curve having a curvature radius (Rg) in the shoulder portion, which consists of a circle tangential to said two curves said curvature radii Ra, Rb and Rg satisfying the requirement of Ra>Rb≧Rg.

* * * * *